United States Patent
Rishi (10) Patent No.: US 6,717,980 B1
(45) Date of Patent: Apr. 6, 2004

(54) REDUCTION OF TRANSMITTER INDUCED CROSS MODULATION IN A RECEIVER

(75) Inventor: Mohindra Rishi, Milpitas, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/316,992

(22) Filed: May 24, 1999

(51) Int. Cl.[7] ................................................ H04B 1/38
(52) U.S. Cl. .......................... 375/219; 375/285; 455/73
(58) Field of Search ................................. 375/219, 220, 375/221, 344, 297, 285; 455/73, 78, 83, 69, 88, 92; 370/276, 278, 282

(56) References Cited

U.S. PATENT DOCUMENTS

| | | | |
|---|---|---|---|
| 3,643,257 A | * 2/1972 | Thomson et al. | 342/92 |
| 4,159,448 A | * 6/1979 | Parham | 370/212 |
| 4,617,656 A | * 10/1986 | Kobayashi et al. | 370/445 |
| 4,741,018 A | * 4/1988 | Potratz et al. | 455/569 |
| 4,952,193 A | 8/1990 | Talwar | 455/63 |
| 5,058,153 A | * 10/1991 | Carew et al. | 379/392.01 |
| 5,199,045 A | * 3/1993 | Kato | 375/141 |
| 5,319,804 A | * 6/1994 | Matsumoto et al. | 455/126 |
| 5,633,937 A | 5/1997 | Ribic | 381/68.4 |
| 5,671,247 A | 9/1997 | Souissi et al. | 375/200 |
| 5,745,531 A | * 4/1998 | Sawahashi et al. | 375/345 |
| 6,111,949 A | * 8/2000 | Sheets et al. | 379/414 |
| 6,122,083 A | * 9/2000 | Ohta et al. | 359/137 |

FOREIGN PATENT DOCUMENTS

| | | | |
|---|---|---|---|
| EP | 0435578 A2 | 7/1991 | H03F/1/32 |
| EP | 0435578 A3 | 7/1993 | H03F/1/32 |
| EP | 0851575 A2 | 7/1998 | H03F/1/32 |

* cited by examiner

*Primary Examiner*—Don N. Vo
(74) *Attorney, Agent, or Firm*—Dicran Halajian (57) ABSTRACT

A transceiver is disclosed having a baseband unit which outputs baseband signals and a modulator which modulates the baseband signals to output a modulated signal. A transmitter amplifier amplifies the modulated signal and outputs a transmit signal to a duplexer. The transceiver further includes a receive amplifier which receives a receive signal from the duplexer, where the receive amplifier has a gain which is modulated by an envelope signal which is proportional to the transmit signal, such as being proportional to the power or square root of the power of the transmit signal. The envelope signal is provided by either the baseband unit or by an envelope detector which receives the output of the receive amplifier. The envelope signal may also be provided by a rectifier which rectifies the output of the receive amplifier.

15 Claims, 7 Drawing Sheets

REDUCTION OF TRANSMITTER INDUCED CROSS MODULATION IN A RECEIVER

RELATED APPLICATIONS

U.S. patent application Ser. No. 09/318,330, entitled "Increase of Transmitter ACPR by Gain Modulation", filed concurrently herewith for Rishi Mohindra, and assigned to the assignee hereof, contains subject matter related to the subject matter of the present patent application. The contents of this patent application are incorporated herein by reference.

BACKGROUND OF THE INVENTION

1. Field of the Invention

The present invention is directed to a device and method for reducing transmitter induced cross modulation in a receiver, such as in code division multiple access (CDMA) telephones or dual mode telephones operating in the cellular and Personal Communication System (PCS) bands of 900 MHz and 1.9 GHz, respectively.

2. Discussion of the Prior Art

A major problem faced in reducing the size of Code Division Multiple Access (CDMA) mobile cellular telephone handsets is the high isolation requirement between the transmitter and the receiver sections, as they are often both operational simultaneously. The transmitter and the receiver connect to the antenna through a duplexer. Typically, duplexers have a very large size in order to provide sufficient isolation between the transmitter and receiver, e.g., in excess of 60 dB.

With the reduction in size of handsets, especially in dual-band CDMA/AMPS designs, where AMPS is Advanced American Mobile Service (AMPS), the duplexers are also becoming smaller at the expense of reduced isolation between the transmitter and receiver ports. Typically, Personal Communication System (PCS) band duplexers have about 45 dB isolation, while the cellular band duplexers have 45–50 dB isolation. This reduced isolation can cause significant cross modulation due to 3rd order nonlinearity of a low noise amplifier (LNA) of the receiver section.

The cross modulation noise results from the modulated transmitter leakage signal of the handset itself from its transmitter section into its receiver section being combined with a large single tone jammer signal in the receive frequency band. The jammer signals result from adjacent channel signals, such as narrow band modulated signals of adjacent base stations, for example.

In particular, due to the third order non-linearity of the LNA, the single tone jammer gets amplitude modulated from the amplitude variations of the transmitter leakage signal. The transmitter leakage signal produces a time varying desensitization of the LNA. Desensitization is the change in the level of a small signal, in the presence of a large signal, at the LNA output.

To reduce the cross modulation power, a highly linear LNA with a large third order intercept point (IP3) requirement may be needed. However, such a highly linear LNA with a large IP3 consumes a large current and thus quickly drains the battery of mobile phones/transceivers. Accordingly, there is a need to reduce the cross modulation power without the need to use highly linear LNA with a large IP3 requirement, and thus minimize current or power consumption of a transceiver.

SUMMARY OF THE INVENTION

The object of the present invention is to provide a controlled receive device and a control method which reduces the problems of conventional receive devices.

Another object of the present invention is to provide a receive or a transceiver device which has reduced cross modulation noise without the need for an inherent highly linear LNA having a large IP3 requirement.

The present invention accomplishes the above and other objects by providing a transceiver having a baseband unit which outputs baseband signals and a modulator which modulates the baseband signals to output a modulated signal. A transmitter amplifier amplifies the modulated signal and outputs a transmit signal to a duplexer. The transceiver further includes a receive amplifier which receives a receive signal from the duplexer, where the receive amplifier has a gain which is modulated by an envelope signal. The envelope signal is proportional to the transmit signal, such as being proportional to the power or square root of the power of the transmit signal.

The envelope signal is provided by the baseband unit. In a preferred embodiment, the envelope signal is provided by an envelope detector which receives the output of the receive amplifier. The envelope signal may also be provided by a rectifier which rectifies the output of the receive amplifier.

In another embodiment, a method for reducing transmitter induced cross modulation in a receiver is provided, which includes the steps of:

forming baseband signals by the baseband unit;

modulating the baseband signals to form a modulated signal;

amplifying the modulated signal to provide a transmit signal to a duplexer;

receiving a receive signal by a receive amplifier from the duplexer to form an amplified receive signal; and modulating the gain of the receive amplifier using an envelope signal which is proportional to the transmit signal, such as being proportional to the power or square root of the power of the transmit signal.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

The present invention relates generally to reducing the cross modulation noise in transceivers or transmitters. The cross modulation noise is typically generated from the modulated transmitter leakage signal being combined with a large single tone jammer signal in the receive frequency band. The cross modulation noise is due to third order non-linearity of a low noise amplifier (LNA), also referred to as the LNA third order intercept point (IP3) characteristics. Illustratively, the transceivers are included in code division multiple access (CDMA) telephones or with related RF baseband integrated circuits (ICs).

Figure 1:
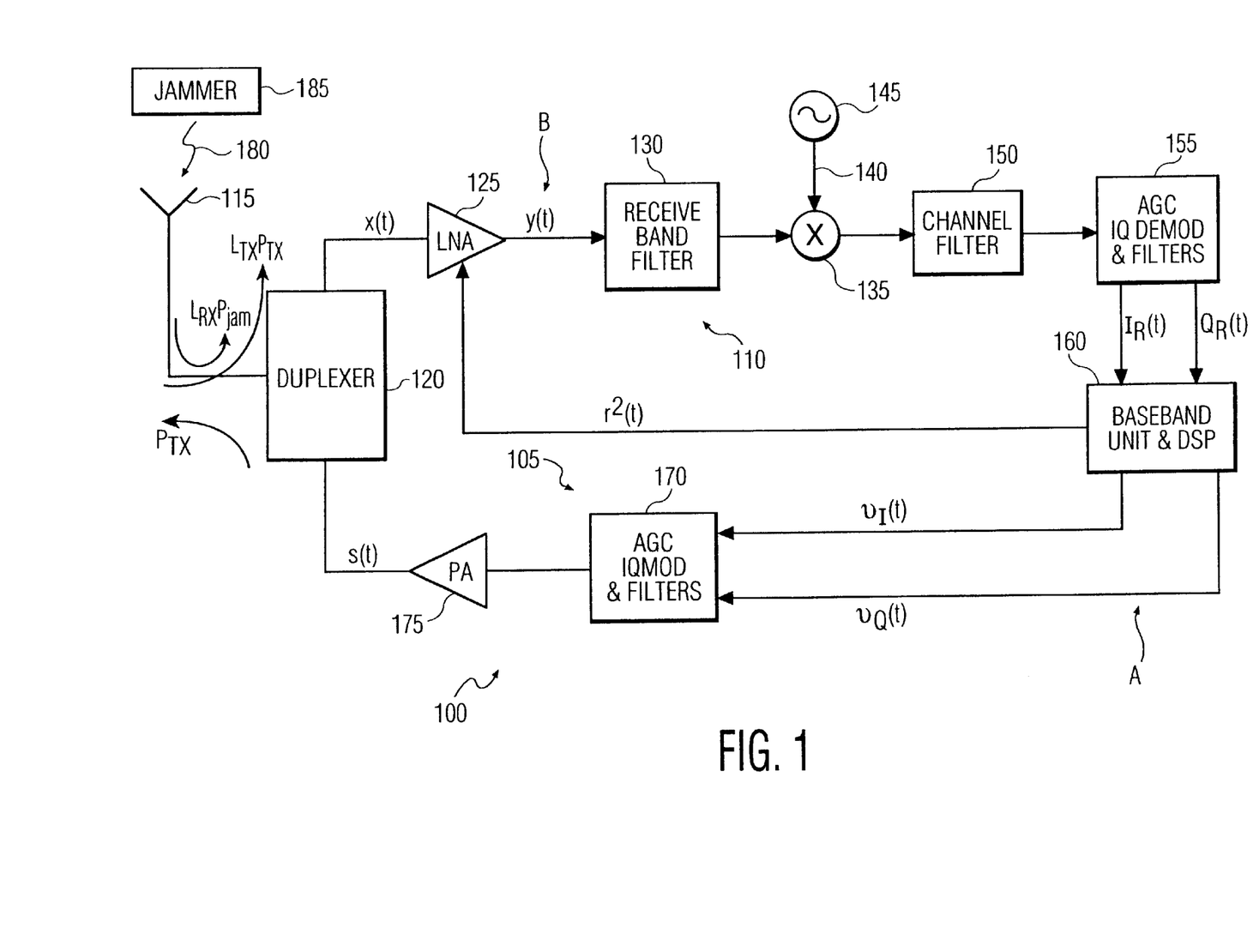
FIG. 1 shows a transceiver circuit having a variable gain low noise amplifier (LNA) which is modulated in response to an envelope signal derived directly from baseband signals according to present invention.

FIG. 1 shows a transceiver circuit 100 used to reduce the cross modulation noise. The transceiver circuit 100 includes a transmit section 105 and a receive section 110 which are simultaneously connected to an antenna 115 through a duplexer 120. The duplexer 120 selectively routes signals based on frequency. For example, a signal having a receive frequency is substantially routed to the receiver section 110 and is substantially isolated from the transmit section 115. Similarly, a signal having a transmit frequency is substantially routed from the transmit section 105 to the antenna 115 and is substantially isolated from the receive section 110. The receive section 110 has an amplifier 125, such as an LNA, which is connected to receive a radio frequency (RF) signal from the antenna 115 through the duplexer 120.

The LNA 125 amplifies the received RF signal x(t) and outputs an amplified signal y(t). A first filter, referred to as an image or a receive band filter 130, filters the amplified RF signal y(t) and provides a filtered signal to a mixer 135. Illustratively, the image filter 130 is a wide-band filter that passes signals in the receive band, and rejects signals outside the receive band. The mixer 135 down-converts the filtered RF signal to an intermediate frequency (IF) signal by mixing the filtered RF signal with a local oscillating signal 140 from a local oscillator 145.

The IF signal is filtered by a channel filter 150 which is narrow band, for example. The filtered IF signal from the channel filter 150 is provided to a demodulator unit 155, which includes an in-phase and quadrature-phase (IQ) demodulator, automatic gain control (AGC) circuits and filters. The demodulator unit 155 outputs demodulated receive $I_R(t)$ and $Q_R(t)$ signals to a baseband unit 160 which includes a processor, such as a digital signal processor (DSP) for further processing, such as conversion to digital form for processing by the DSP and reconversion to audio signals to be sent to a speaker of the handset, for example.

The above describes receiving and processing of signals by the receive unit 110. By contrast, the transmission unit 105 processes and transmits signals as follows. The baseband unit 160 outputs transmit IT and QT signals, referred to as $v_I(t)$, $v_Q(t)$, which are provided to a modulator unit 170 of the transmit unit 105. The modulator unit 170 includes an IQ modulator as well as AGC circuits and filters. The modulator unit 170 converts the transmit baseband signals $v_I(t)$, $v_Q(t)$ to a modulated RF signal by filtering, modulating, and upconverting to RF using a local oscillator as is well known in the art.

The modulated RF signal is provided to a power amplifier (PA) 175. The power amplifier 175 amplifies the RF signal and provides an amplified signal s(t) to the duplexer 120 for transmission by the antenna 115. The power of the amplified signal s(t) is referred to as the transmitted power $P_{TX}$. A portion $L_{TX}P_{TX}$ of this transmitted power $P_{TX}$ leaks through the duplexer 120 into the LNA 125 to cause cross modulation noise when combined with the jammer signal coming into the LNA 125. The duplexer attenuation or isolation at the transmit frequency $f_T$ is referred to as $L_{TX}$. The portion of the jammer signal $P_{jam}$ which leaks into the LNA 125 is the product $L_{RX}P_{jam}$ of the jammer signal power $P_{jam}$ and the insertion loss of the duplexer 120 at the receive frequency $f_R$ is referred to as $L_{RX}$.

Illustratively, the jammer 185 is a telephone operating with Advanced American Mobile Service (AMPS) which interferes or jams a Code Division Multiple Access (CDMA) telephone having the transceiver 100. As will be described in connection with FIG. 2, the jammer signal 180 may be an in-band unmodulated carrier CW tone which gets cross-modulated and produces an AM spectrum. In particular, the unmodulated jammer signal 180 spreads and produces a modulated leakage signal $L_{RX}P_{jam}$ around the receive frequency $f_{RX}$. The modulated leakage signal $L_{RX}P_{jam}$ leaks into the LNA 125.

Figure 2:
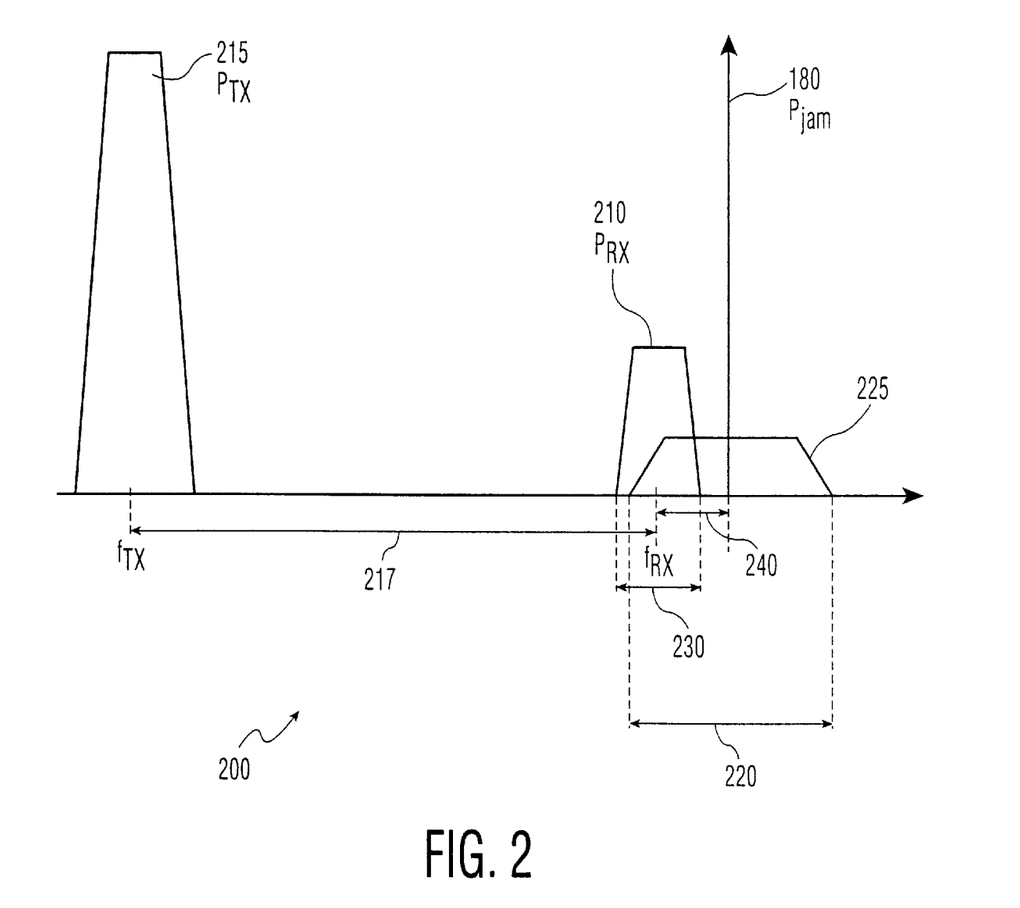
FIG. 2 shows a spectrum of a 1-tone desensitisation test where a single tone unmodulated jammer signal spreads into the receive band of the transceiver circuit of FIG. 1 according to present invention.

FIG. 2 shows an illustrative example of a spectrum 200 of a 1-tone desensitisation test, where a CDMA mobile telephone/handset having the transceiver 100 (FIG. 1) is subjected to an unmodulated carrier tone, such as a single tone jammer signal 180 (also shown in FIG. 1) having a power referred to as $P_{jam}$. The single tone jammer 180 is 71 dB stronger than the wanted, e.g., CDMA, received signal 210, having a power referred to as $P_{RX}$ which is at −101 dBm level. The wanted received signal $P_{RX}$ 210 is only approximately 3 dB higher than the sensitivity level, where the sensitivity level is the smallest signal level which can be detected by the receiver section 110 (FIG. 1).

The mobile's transmitter power $P_{TX}$ 215, at the transmit frequency $f_{TX}$, is kept at a maximum level which is approximately 23 dBm for cellular and PCS applications. The transmit and receive center frequencies $f_{TX}$, $f_{RX}$ are separated by a duplex band 217, which is typically 45 MHz for cellular operation and 80 MHz for PCS operation.

Because of the CDMA transmitter open and closed loop power control, the handset is forced to transmit the maximum power when the received signal 210 is close to the sensitivity level of −104 dBm. With a 50 dB transmit isolation $L_{tx}$ in the duplexer 120, the transmitter leakage $L_{TX}P_{TX}$ into the receiver LNA 125 is approximately −25 dBm.

The received unmodulated interferer from the jammer signal 180 at the LNA input is about −33 dBm, considering a 3 dB receive insertion loss $L_{RX}$ in the duplexer receive path. The image filter 130 has about 30 dB rejection at the transmitter frequency $f_{TX}$, and therefore the mixer 135 is sufficiently protected from cross modulation. The attenuated mobile transmitter signal $L_{TX}P_{TX}$, which leaks into the LNA 125 from the PA 175, is combined with a signal $L_{RX}P_{jam}$ resulting from the 1-tone jammer signal 180 entering the LNA 125 through the duplexer 120. The combined signals $L_{TX}P_{TX}$, $L_{RX}P_{jam}$ are fed to the LNA 125.

The time varying desensitization of the LNA creates a weak amplitude modulation (AM) in the received signal $P_{RX}$ 210. The AM modulation is so weak that it does not significantly affect the wanted signal to noise ratio, i.e., the S/N of the traffic, or the sync and the pilot channels after despreading. However, the effect of the AM modulation on strong adjacent channel interferers at the LNA input, such as the jammer signal $P_{jam}$ 180, can be very severe. Under normal circumstances, these strong narrow band AMPS interferers, e.g., jammer signal $P_{jam}$ 180, are completely removed by the channel filter 150 before the despreading occurs. With the weak AM modulation however, a small part of the power of these interferers 180 are spread over a 2.5 MHz band 220, centered around the interfering signal itself, i.e., around $P_{jam}$ 180. This spread signal resulting from the AM modulation is shown as reference numeral 225 in FIG. 2.

Typically, the jammer signal $P_{jam}$ 180 is present just outside the edge of the channel filter pass band 230, and therefore a significant part of the cross modulation signal/noise power 225 falls within the channel filter pass band 230.

As described, the cross modulation noise 225 may be viewed as being produced by the AM modulation of the received signal $P_{RX}$ 210 resulting from the time varying LNA desensitization. The received signal $P_{RX}$ 210 is the wanted signal that the LNA 125 receives from a base station, for example.

In a 1-tone desensitisation test, interferers such as $P_{jam}$ 180, are a certain frequency distance 240 away from the wanted signal $P_{RX}$ 210. This frequency distance 240 is 900 kHz (Cellular band) or 1.25 MHz (PCS band). Therefore, as shown in FIG. 2, a considerable part of the 2.5 MHz band 220 overlaps with the band 230 of the received signal $P_{RX}$ 210. As the narrow band AMPS interferer $P_{jam}$ 180 is 71 dB stronger than the received signal 210, there is a significant interference power in the part of the 2.5 MHz band 220 that overlaps with the received signal 210. This overlapped interference power results in considerable reduction in the signal to noise ratio after despreading.

Referring to FIGS. 1 and 2, to reduce the cross modulation noise 225, the baseband unit 160 outputs a squared envelope signal $r^2(t)$ to control the gain of the LNA 125. In particular, the squared envelope signal $r^2(t)$ is proportional to the power of the transmitted signal $P_{TX}$. The squared envelope signal $r^2(t)$ changes or modulates the gain of the LNA 125 in accordance with the variation of the instantaneous transmitter power.

In another embodiment to be described in connection with FIGS. 5–6, the squared envelope signal $r^2(t)$ is not derived from the transmitter baseband signals $v_I(t)$, $v_Q(t)$. Rather, the squared envelope signal $r^2(t)$ is derived directly form the output of the LNA 125. More particularly, the squared envelope signal $r^2(t)$ is derived from the envelope of the modulated output of the LNA 125 using an envelope detector 610.

The cross modulation noise is reduced to alleviate the need to use highly linear LNAs, which require very high IP3 at the expense of increased current consumption. In particular, the cross modulation noise is reduced by performing inverse modulation on the LNA 125 for linearization thereof, where the gain of the LNA 125 is changed or modulated. As shown in FIG. 1, the LNA gain is modulated using the squared envelope signal $r^2(t)$ derived from the baseband signals $v_I(t)$, $v_Q(t)$ which are modulated and leak into the LNA as the leakage signal $L_{TX}P_{TX}$ to cause the cross modulation noise 225.

More particularly, equation (1) shows the square of envelope signal $r^2(t)$, which is proportional to the instantaneous power $P_T(t)$ of the LNA output signal y(t) and is provided from the baseband unit 160 to a gain modulation control port of the LNA 125 for controlling the gain thereof.

$$r^2(t)=K[v_I^2(t+\Delta t)+v_Q^2(t+\Delta t)] \quad (1)$$

where: $K=f(P_{TX}, f_{TX})$, i.e., K the LNA gain control factor which is a function of the transmitted power $P_{TX}$ and is calibrated over the transmit band frequency during production; and $\Delta t$ is the time delay from point A to point B shown in FIG. 1, i.e., from the input to the modulator unit 170 to the output of the LNA 125.

Equation (2) shows the output y(t) of the LNA 125:

$$y(t)=a_1[1+r^2(t)]x(t)+a_3x^3(t) \quad (2)$$

The squared time-varying total gain $a_1(t)$ of the LNA 125 is given by equation (3):

$$a_1(t) = a_1\left[1 + E\frac{P_T(t)}{P_{IP3}}\right] \quad (3)$$

where: $P_T(t)$ is the instantaneous power of the transmitter leakage at the LNA output;

E is the envelope gain and is set to approximately one from best results; and $P_{IP3}$ is the LNA output IP3 at the transmit frequency $f_{TX}$.

The instantaneous power $P_T(t)$ depends on the total gain G from point A to point B, shown in FIG. 1, and is given by equation (4)

$$P_T(t)=G[V_I^2(t+\Delta t)+V_Q^2(t+\Delta t)] \quad (4)$$

The value of the LNA gain control factor K can be determined from equations 2, 3 and 4.

Figure 3:
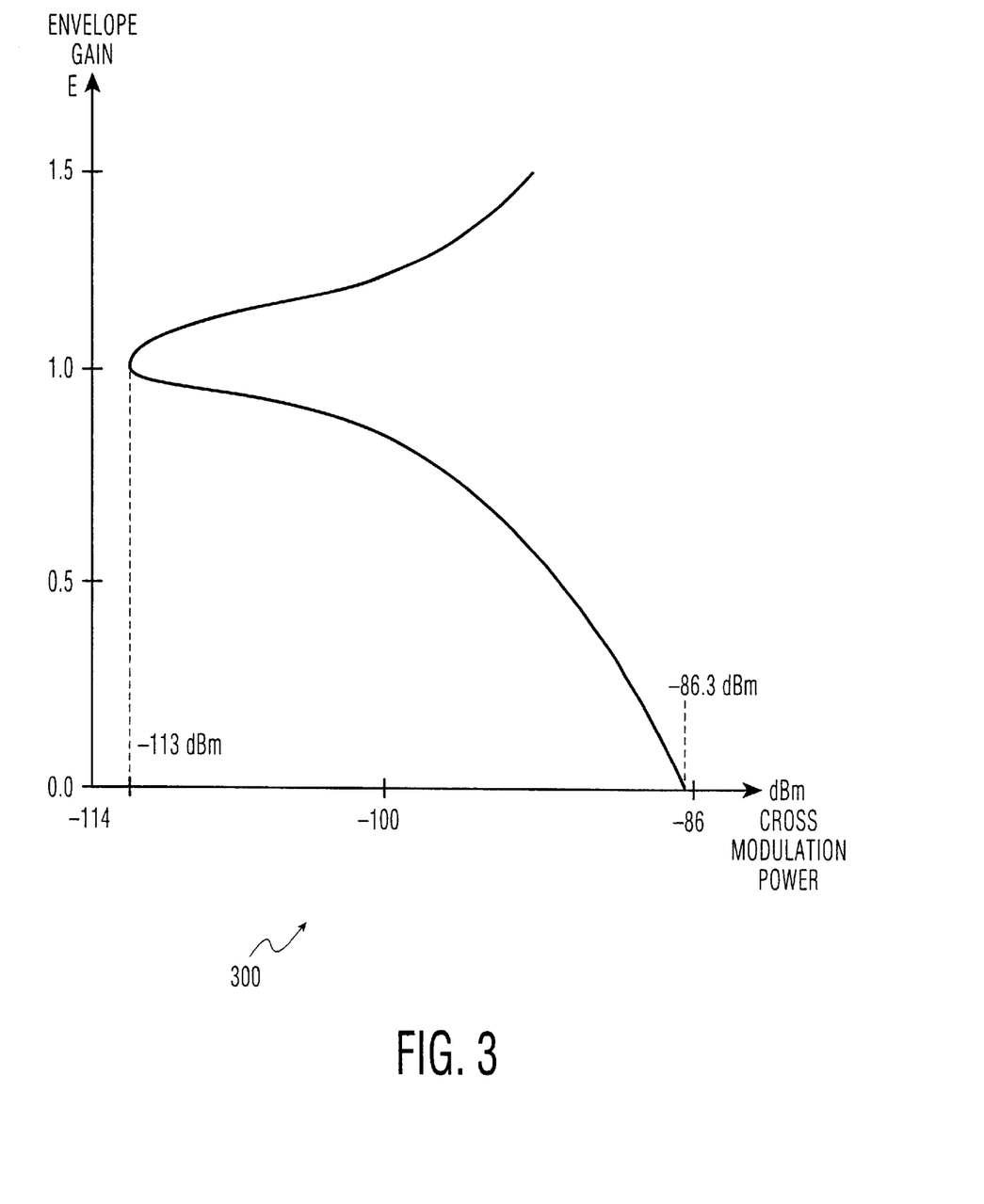
FIG. 3 shows a plot of the envelope gain versus the cross modulation noise power according to present invention.

FIG. 3 shows the effect of the envelope gain E on the cross modulation noise power in the receive frequency band, where a plot 300 of the envelope gain E versus the cross modulation noise power in dBm is shown. The LNA input IP3 was taken as 2 dBm, the transmitter power leakage into the LNA was taken as –23 dBm, and the single tone jammer power was –33 dBm. The cross modulation noise power is approximately –86.3 dBm in the receive band, without linearization i.e. for E=0. In FIG. 3, it can be seen that the cross modulation power varies between –86.3 dBm (for E=0) and –113 dBm (for E=1). The simulator noise floor gave –116 dBm cross modulation noise power with no LNA nonlinearity.

The transceiver 100 is calibrated for K over the transmit frequency band, and for a range of transmit power, such as from the maximum level to approximately 10 dB down, for example, so that the calibrated K corresponds to the optimum value of E. The cross modulation power can be measured either directly in the receive channel band at IQ baseband, or indirectly by computing the IS-95 frame error rate.

Figure 4:
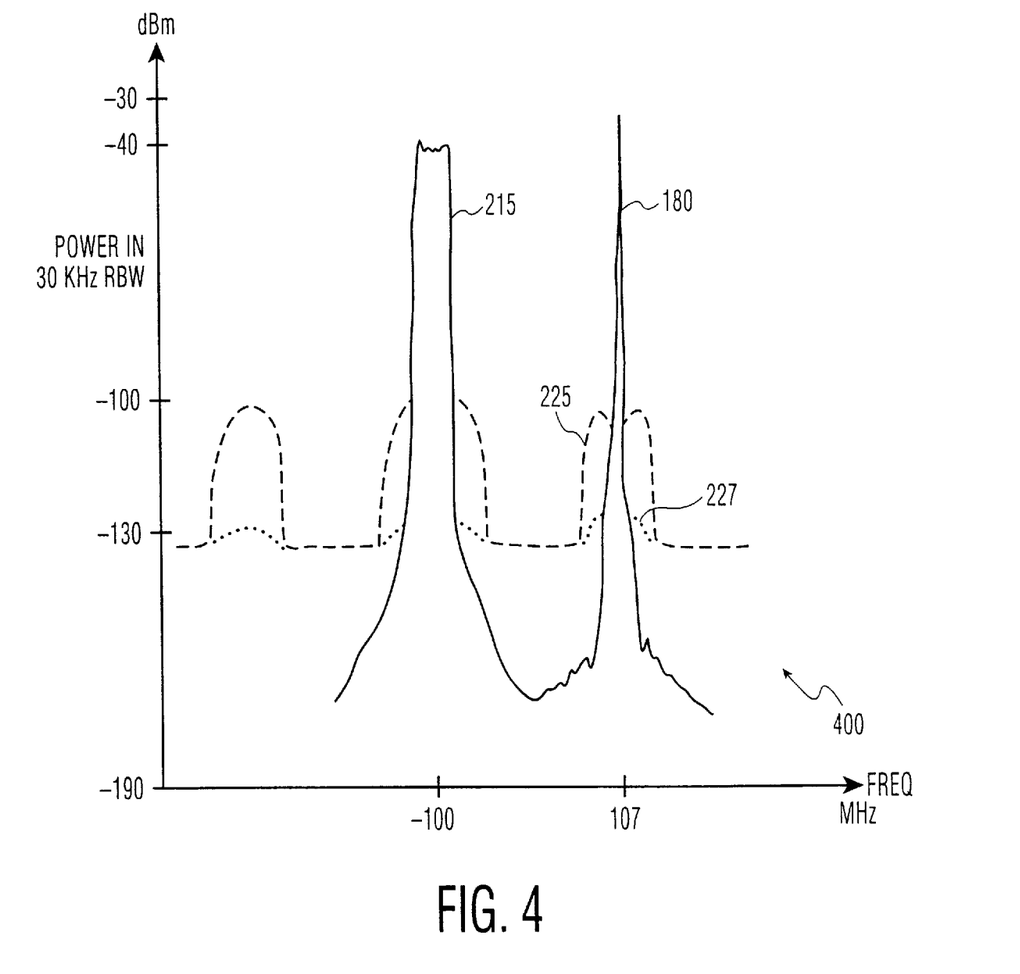
FIG. 4 shows the spectrum without and with inverse modulation resulting in reduction of the cross modulation noise according to present invention.

The FIG. 4 shows simulated spectrum 400 for the LNA cross modulation with linearization (E=1), shown as dotted lines, and without (E=0) linearization shown as dashed lines. The y-axis is power in a 30 kHz receiver bandwidth in units of dBm, while the x-axis is frequency in MHz. Similar to FIG. 3, the LNA input IP3 is 2 dBm, the transmitter power leakage into the LNA is –23 dBm, and the single tone jammer power is –33 dBm. It can be seen from this spectrum 400, how significantly linearization reduces the cross modulation noise power from a high level 225 to a low level 227.

The inverse modulation is kept active all the time in the highest 10 dB transmit range, independent of the presence of jammers. This is achieved by providing the squared envelope signal $r^2(t)$ from the baseband unit 150 to the LNA 125.

Figure 5:
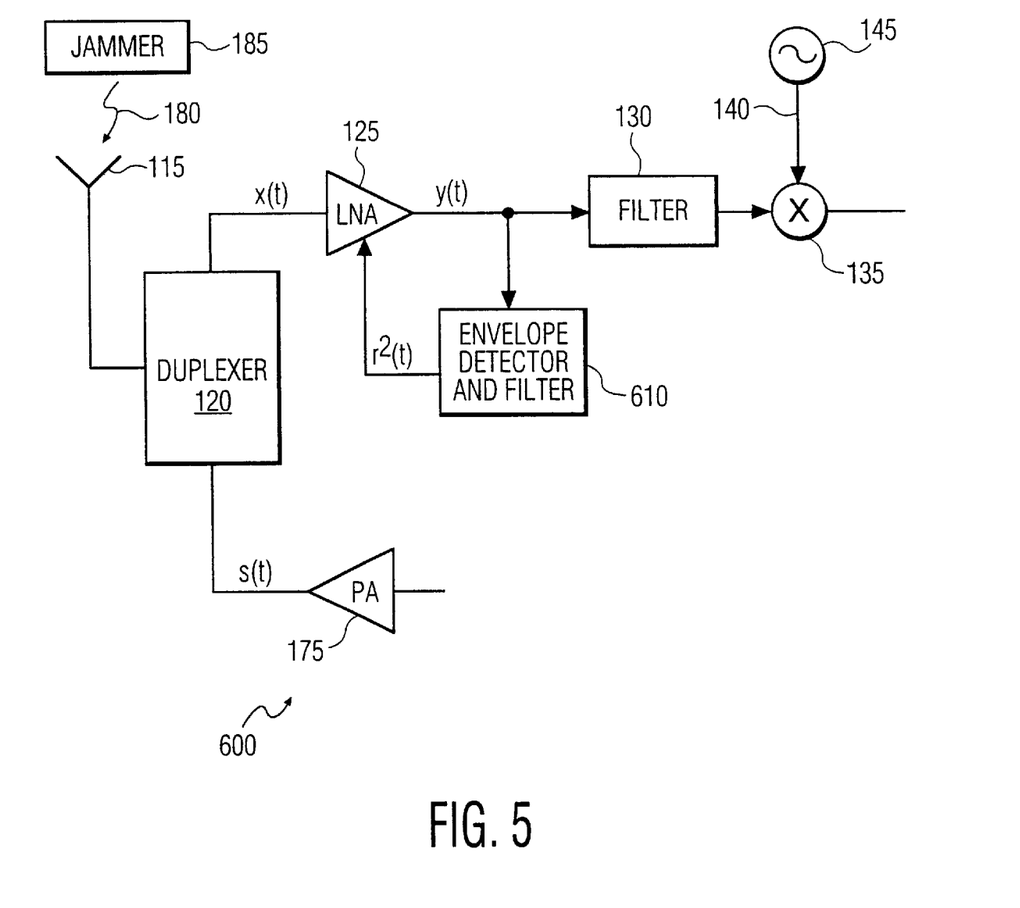
FIG. 5 shows a transceiver circuit having an envelope detector according to another embodiment of the present invention.
Figure 6:
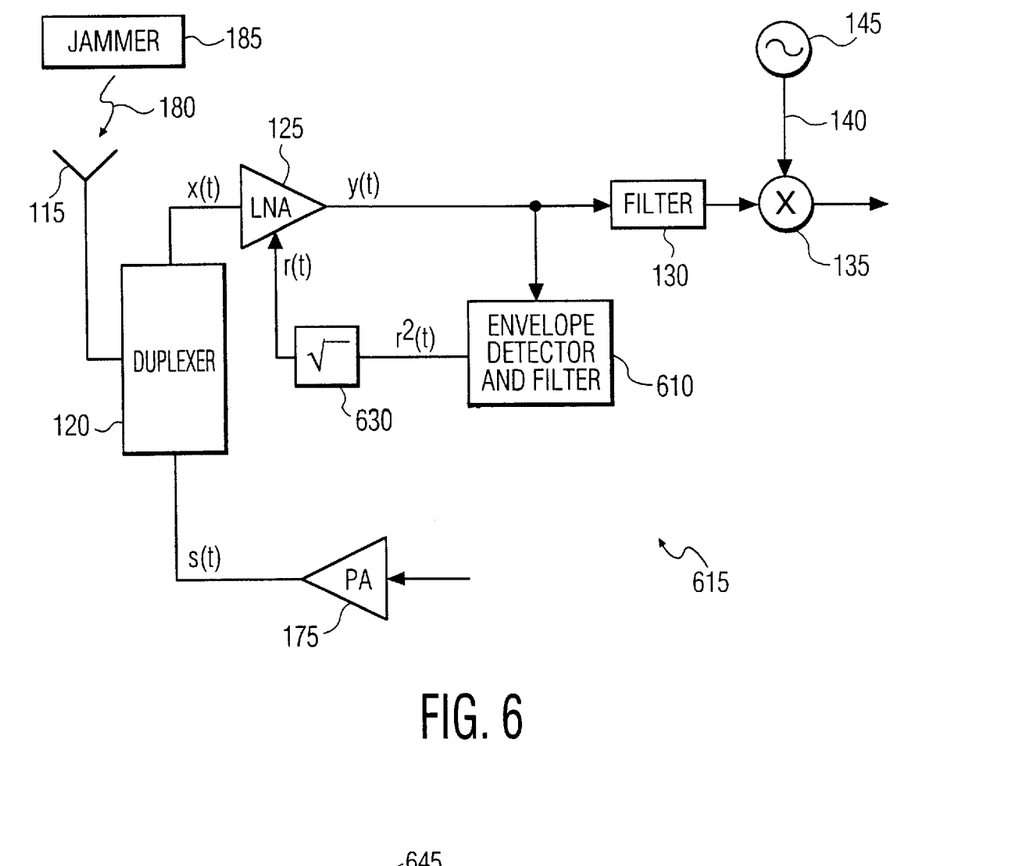
FIG. 6 shows another embodiment of the transceiver according to present invention.

As will be apparent, in other embodiments shown in FIGS. 5–6, there is no need for such an extensive calibration, since the signal used to modulate the LNA 125 is directly obtained from the output of the LNA 125, where an envelope detector provides the squared envelope signal $r^2(t)$. Any change in the leakage signal into the LNA 125, occurring due to transmitter power level changes, is reflected in the LNA output signal. Accordingly, the squared envelope signal $r^2(t)$ automatically changes in response to the changing leakage signal, and thus there is no need for any calibration over the transmitter power range and frequency range. In these other embodiments, a calibration of a single point is sufficient, such as at a maximum transmit power $P_{TX}$ at one particular transmit frequency $f_{TX}$.

FIG. 5 shows a transceiver circuit 600 according to another embodiment of the present invention. In the transceiver circuit 600, the envelope signal r(t) is derived directly from the LNA 125 itself, where the envelope of the modulated RF output of the LNA 125 is extracted by an envelope detector 610. This is in contrast to the transceiver 100 shown in FIG. 1, where the squared envelope signal $r^2(t)$ is derived from the baseband signals $v_I(t)$, $V_Q(t)$ provided from the baseband unit 160 for modulation and transmission, where a portion leaks into the LNA 125 as the transmitter leakage signal $P_{TX}L_{TX}$.

Unlike the transceiver circuit 100 of FIG. 1, the transceiver circuit 600 of FIG. 5 needs only a single point calibration, since the squared envelope signal $r^2(t)$ used to modulate the LNA 125, being derived directly form the LNA output, automatically varies with leakage signal x(t) at the input of the LNA 125.

As shown in FIG. 5, the LNA receives an RF input signal x(t), which is largely the signal from-the power amplifier 175. The LNA 125 amplifies the input signal x(t) and provides an output signal y(t) to the image filter 130 and the envelope detector 610. The envelope detector 610 detects and extracts the envelope of the amplified RF output signal y(t) and outputs the squared envelope signal $r^2(t)$ FIG. 6 shows another embodiment 615 of the transceiver 600 of FIG. 5. For simplicity, all the elements of the transceivers 600, 615 are not shown in FIGS. 5–6. However, it is understood the transceivers 600, 615 further include the same elements shown in FIG. 1, namely, IF filter 150, demodulator unit 155, the baseband unit 160, the processor 165, and the modulator unit 170.

As shown in FIG. 6, the envelope of the LNA output y(t) is detected by the envelope detector and filter 610 to provide a filtered squared envelope signal $r^2(t)$. In this embodiment, a square root unit 630 is provided to receive the output of the envelope detector 610 and provides the envelope signal r(t) to a control port of the LNA 125 for controlling the gain of the LNA 125. Illustratively, the square root operation is implemented by a 2:1 dB—dB slope for the LNA voltage controlled gain. Alternatively, the envelope detector/filter 610 along with the square root unit 630 are implemented by using the circuit shown in FIG. 7.

Figure 7:
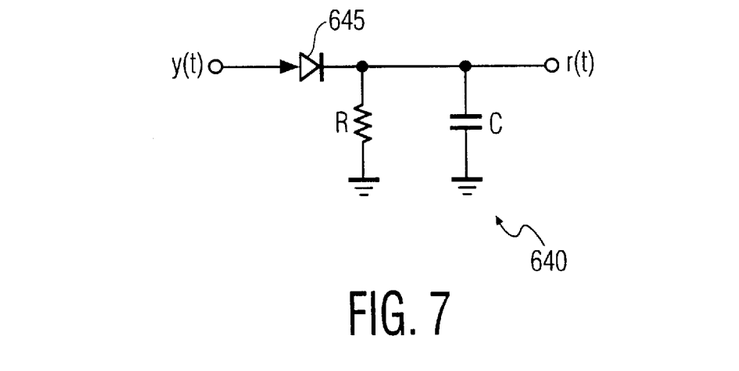
FIG. 7 shows an embodiment of an envelope detector and square root unit of FIG. 6.

FIG. 7 shows a rectifier 640 as one embodiment of the envelope detector/filter 610 and the square root unit 630 of FIG. 6. The rectifier 640 comprises a diode 645 which is connected to a resistor R and a capacitor C to rectify the output of the LNA 125 (FIG. 6). Illustratively, the rectifier 640 is a half wave or a full wave rectifier. The resistor R is connected between the output of the diode 645 and ground. Similarly, a capacitor C is connected between the output of the diode 645 and ground. The resulting rectified output is proportional to the envelope signal r(t).

It is noteworthy that the preferred embodiment of the transceivers 600, 615 shown in FIGS. 5–6, does not include the square root unit 630 or the rectifier circuit 640. Thus, in the preferred embodiment of the transceiver 600, the gain of the LNA is modulate using the squared envelope signal $r^2(t)$.

The output signal y(t) of the LNA 125 is given by equation (6):

$$y(t)=r(t)\cos \omega_c t \qquad (6)$$

Where $\omega_c$ is the carrier frequency.

The square $y^2(t)$ of the LNA output y(t), which is the signal detected by the envelope detector 610, is given by equation (7):

$$y^2(t) = \frac{r^2}{2}(t) + \frac{r^2}{2}\cos 2\omega_c t \qquad (7)$$

The filter of the envelope detector 610 outputs a signal f(t) given by equation (8):

$$f(t) \approx \frac{r^2}{2}(t+\Delta t_c) \qquad (8)$$

As long as $1/(\Delta t_c)$ is much greater than the bandwidth of the transmitted output signal from the power amplifier (PA) 170, then equation (9) applies:

$$r^2(t+\Delta t)\approx r^2(t) \qquad (9)$$

Next, the square root unit 630 receives the filtered output of the envelope detector 610, which is approximately $r^2(t)$ as shown in equation (9). The square root unit 630 provides the envelope signal r(t) to the LNA control port for modulating the LNA gain. The squared envelope signal $r^2(t)$ is shown in equation (1).

Figure 8:
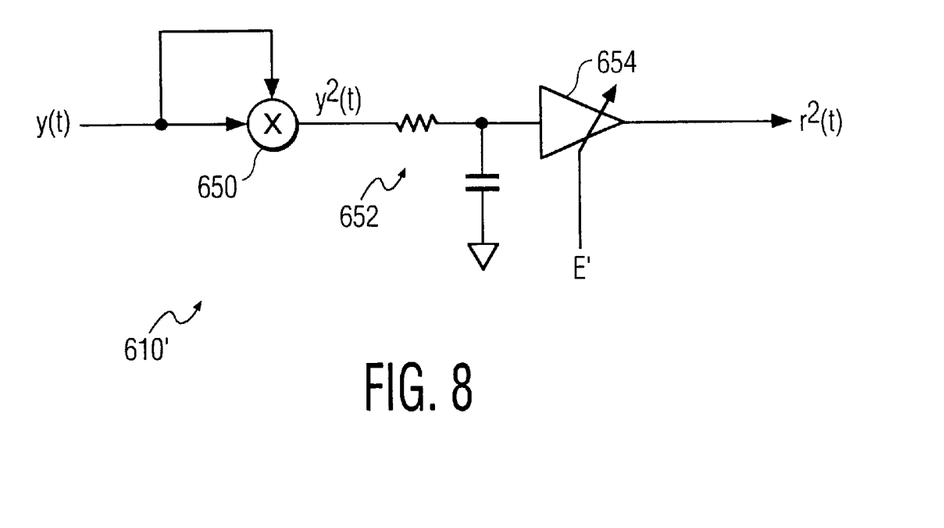
FIG. 8 shows the envelope detector and filter of FIG. 5 in greater detail.
Figure 9:
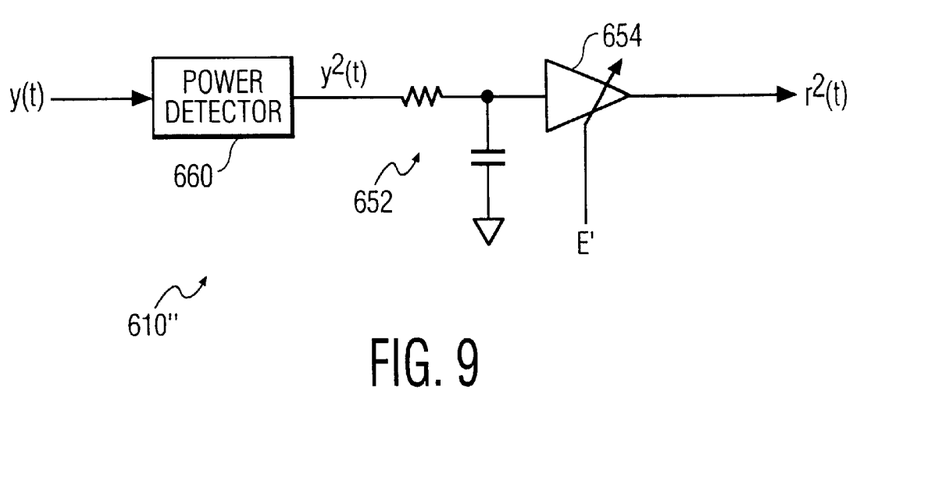
FIG. 9 shows another embodiments of the envelope detector and filter of FIG. 5.

FIGS. 8 and 9 show other embodiments 610', 610" of the envelope detector and filter 610, where the filter is realized by an RC circuit having a resistor R and a capacitor C, where $1/(RC)<<\omega_c$, $\omega_c$, being the carrier frequency of the RF signal y(t), and $1/(RC)>>$bandwidth of the signal.

The envelope detector and filter 610' of FIG. 8 is realized using a multiplier 650 which receives the output y(t) of the LNA at two input multiplication ports. The multiplier 650 outputs the square of its input, namely, output the signal $y^2(t)$, which is filtered by filter 652 having an in-line resistor followed by a capacitor connected to ground. The output of the filter 652 is provided to an envelope amplifier 654 having a selectable gain E' which is set during calibration as described above. The envelope amplifier 654 outputs the squared envelope signal $r^2(t)$.

In the envelope detector and filter 610" shown in FIG. 9, a power detector 660 replaces the multiplier 650 which receives the LNA output signal y(t) and outputs its square signal $y^2(t)$. Illustratively, the power detector 660 is a schotky diode. Since a power signal is related to the square of a voltage signal, the output of the power meter 660 is proportional to $y^2(t)$, i.e., the same as the output of the multiplier 650 (FIG. 8).

It is noteworthy than in both embodiments shown in FIGS. 5 and 6, a more relaxed duplexer 120 can be used. The duplexer 120 can have much lower isolation between the transmitter and receiver units 105, 110. In this case where the duplexer 120 provides reduced isolation between the power amplifier 175 of the transmitter 105 and the LNA 125 of the receiver 110, the power of the transmitted signal $P_{TX}$ is much greater than the power of the jammer signal $P_{jam}$ at the LNA input. Thus, the envelope detector 610 will only respond to the envelope of the transmitted signal $P_{TX}$ leaking into the LNA 125, and the desired envelope is not distorted by the jammer signal $P_{jam}$. Thus, in this case where $P_{TX} \gg P_{jam}$, a more accurate compensation can be done for the cross modulation.

In accordance with other embodiments of the present invention, methods of reducing cross modulation noise are provided. In particular, the methods include reducing the cross modulation noise by using the envelope signal r(t), or preferably the square thereof, i.e., $r^2(t)$, to modulate the gain of the LNA 125. In one method, the envelope signal r(t), or preferably the square thereof $r^2(t)$, is derived directly from the baseband signals provided by the baseband unit 160, as shown in FIG. 1. In a preferred method, the envelope signal r(t), or preferably the square thereof $r^2(t)$, is derived directly from the LNA 125 using an envelope detector 610, as shown in FIGS. 5–6. The envelope detector 610 detects the envelope of the RF output signal y(t) provided from the LNA 125.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A transceiver comprising:
a baseband unit which outputs baseband signals;
a modulator which modulates said baseband signals to output a modulated signal;
a transmitter amplifier which amplifies said modulated signal and outputs a transmit signal to a duplexer;
a receive amplifier which receives a receive signal from said duplexer; said receive amplifier having a gain which is modulated by an envelope signal which is proportional to said transmit signal, wherein said envelope signal is provided by said baseband unit.

2. The transceiver of claim 1, wherein said envelope signal is proportional to a power of said transmit signal.

3. The transceiver of claim 1, further comprising a rectifier which rectifies an output of said receive amplifier and outputs said envelope signal.

4. A transceiver comprising:
a baseband unit which outputs baseband signals;
a modulator which modulates said baseband signals to output a modulated signal;
a transmitter amplifier which amplifies said modulated signal and outputs a transmit signal to a duplexer;
a receive amplifier which receives a receive signal from said duplexer; said receive amplifier having a gain which is modulated by an envelope signal which is proportional to said transmit signal; and
an envelope detector which receives an output of said receive amplifier and provides said envelope signal, wherein said envelope detector is directly connected to said receive amplifier.

5. A transceiver comprising:
a baseband unit which outputs baseband signals;
a modulator which modulates said baseband signals to output a modulated signal;
a transmitter amplifier which amplifies said modulated signal and outputs a transmit signal to a duplexer;
a receive amplifier which receives a receive signal from said duplexer; said receive amplifier having a gain which is modulated by an envelope signal which is proportional to said transmit signal;
an envelope detector which receives an output of said receive amplifier and outputs said envelop signal; and
a square root unit which receives said envelope signal and outputs a square root signal to modulate said gain of said receive amplifier.

6. A method for reducing transmitter induced cross modulation in a receiver comprising the steps of:
forming baseband signals by a baseband unit;
modulating said baseband signals to form a modulated signal;
amplifying said modulated signal to provide a transmit signal to a duplexer;
receiving a receive signal by a receive amplifier from said duplexer to form an amplified receive signal; and
modulating a gain of said receive amplifier using an envelope signal which is proportional to said transmit signal, wherein said envelope signal is provided by said baseband unit.

7. The method of claim 6, wherein said envelope signal is proportional to a power of said transmit signal.

8. The method of claim 6, further comprising rectifying an output of said receive amplifier to form said envelope signal.

9. A transceiver comprising:
means for forming baseband signals;
means for modulating said baseband signals to form a modulated signal;
means for amplifying said modulated signal to provide a transmit signal to a duplexer;
means for receiving a receive signal by a receive amplifier from said duplexer to form an amplified receive signal;
means for detecting an envelope of said amplified receive signal to form an envelope signal which is proportional to said transmit signal; and
means for forming a square root of said envelope signal to modulate a gain of said receive amplifier.

10. The transceiver of claim 9, wherein said envelope signal which is proportional to a power of said transmit signal.

11. The transceiver of claim 9, wherein said envelope signal is provided by said means for forming said baseband signals.

12. A method for reducing transmitter induced cross modulation in a receiver comprising the steps of:
forming baseband signals by a baseband unit;
modulating said baseband signals to form a modulated signal;
amplifying said modulated signal to provide a transmit signal to a duplexer;
receiving a receive signal by a receive amplifier from said duplexer to form an amplified receive signal;
modulating a gain of said receive amplifier using an envelope signal which is proportional to said transmit signal; and
detecting an envelope of said amplified receive signal by an envelope detector which is directly connected to said receive amplifier to form said envelope signal.

13. A method for reducing transmitter induced cross modulation in a receiver comprising the steps of:
forming baseband signals by a baseband unit;
modulating said baseband signals to form a modulated signal;
amplifying said modulated signal to provide a transmit signal to a duplexer;

receiving a receive signal by a receive amplifier from said duplexer to form an amplified receive signal;

detecting an envelope of said amplified receive signal by an envelope detector to form an envelope signal which is proportional to said transmit signal; and forming a square root of said envelope signal to modulate a gain of said receive amplifier.

14. A method for reducing transmitter induced cross modulation in a receiver comprising the steps of:

transmitting a transmit signal through a duplexer;

receiving a receive signal by an amplifier of said receiver through said duplexer;

forming an envelope signal which is proportional to a power of said transmit signal; and modulating said amplifier using said envelope signal, wherein the forming step forms said envelope signal from baseband signals that form said transmit signal.

15. A method for reducing transmitter induced cross modulation in a receiver comprising the steps of:

transmitting a transmit signal through a duplexer;

receiving a receive signal by an amplifier of said receiver through said duplexer;

forming an envelope signal which is proportional to a power of said transmit signal; and modulating said amplifier using said envelope signal, wherein the forming step forms said envelope signal by an envelope detector which is directly connected between an output and a control input of said amplifier.

* * * * *